United States Patent
Dürr et al.

(10) Patent No.: US 7,072,090 B2
(45) Date of Patent: Jul. 4, 2006

(54) ADDRESSING OF AN SLM

(75) Inventors: Peter Dürr, Dresden (DE); Ulric Llungblad, Mölndal (SE)

(73) Assignee: Micronic Laser Systems AB, Taby (SE)

( * ) Notice: Subject to any disclaimer, the term of this patent is extended or adjusted under 35 U.S.C. 154(b) by 0 days.

(21) Appl. No.: 10/829,679

(22) Filed: Apr. 22, 2004

(65) Prior Publication Data

US 2005/0237592 A1  Oct. 27, 2005

(51) Int. Cl.
*G02B 26/08* (2006.01)
*G02B 26/00* (2006.01)

(52) U.S. Cl. .................... 359/239; 359/290; 359/291; 359/223; 359/224

(58) Field of Classification Search ................ 359/239, 359/290, 291, 295, 298, 223, 224
See application file for complete search history.

(56) References Cited

U.S. PATENT DOCUMENTS

| | | | | |
|---|---|---|---|---|
| 5,949,570 A | * | 9/1999 | Shiono et al. | 359/291 |
| 6,323,982 B1 | * | 11/2001 | Hornbeck | 359/224 |
| 6,600,591 B1 | * | 7/2003 | Anderson et al. | 359/291 |
| 2005/0122558 A1 | * | 6/2005 | Ljungblad | 359/237 |

* cited by examiner

*Primary Examiner*—Timothy Thompson
(74) *Attorney, Agent, or Firm*—Ernest J. Beffel, Jr.; Haynes Beffel & Wolfeld LLP

(57) ABSTRACT

The present invention relates to a method to reduce charging effects affecting a degree of movement of at least one movable micro mirror in a spatial light modulator, said at least one movable micro mirror is electrostatically attractable to at least one electrode, including the action of attracting electrostatically said at least one micro mirror in a sequence of reversed electrical field between said micro mirror and said at least one electrode.

7 Claims, 5 Drawing Sheets

ADDRESSING OF AN SLM

TECHNICAL FIELD

The present invention relates to a method of operating a spatial light modulator, in particular it relates to an improved addressing method to reduce charging effects of individual pixels in said spatial light modulator.

BACKGROUND OF THE INVENTION

Modern UV-lithography is searching for new highly parallel writing concepts. Spatial light modulation (SLM) with optical MEMS devices offers such possibilities. An SLM chip may comprise a DRAM-like CMOS circuitry with several million individually addressable pixels on top. Said pixels are deflected due to a difference in electrostatic force between a mirror element and an address electrode. A pattern generator using the SLM is described in U.S. Pat. No. 6,373,619 assigned to the same assignee as this invention. This patent discloses in short a small field stepper, which exposes a series of images of the SLM. A workpiece is arranged on a stage, which is continuously moving and a pulsed electromagnetic radiation source (which could be a pulsed laser, a flash lamp, a flash from a synchrotron light source, etc) flashes and freezes an image of the SLM on the workpiece. The SLM is reprogrammed with a new pattern before each flash so a contiguous image is composed on the workpiece.

The SLM with an array of actuators used in a mask-writing tool is loaded with a specific pattern, where each actuator is in an addressed or a non-addressed state before each stamp is printed. This pattern is a subset of the pattern to be printed on the mask. The SLM is loaded with patterns in this way a number of times for each strip. After the writing of the strip consisting of a series of stamps over the full length of a mask substrate, the stage is moved back to an initial position in preparation for writing of the next strip.

Charging of micro mirror surfaces or addressing electrode surfaces, hereafter called "charging", is a cumulative effect that may limit the performance of micro mechanical actuators. The charging effect manifests itself by a gradually increased change of the actuator position when all parameters are kept constant in a deflected state. It further manifests itself by curing out when the actuator is left in the non-addressed state for a sufficient amount of time. Both the build-up and curing-out are non-linear effects. The resulting position at a given time thus depends not only on the addressing voltage at that time, but also on the history of addressing of this particular actuator element. Therefore the response of the actuator may become inaccurate resulting in a reduced placement accuracy of features on a workpiece in the lithography process, which is a problem.

SUMMARY OF THE INVENTION

Accordingly, it is an object of the present invention to provide a method, which eliminates or at least reduces the above-mentioned problem.

This object, among others, is according to a first aspect of the invention attained by a method to reduce charging effects affecting a degree of deflection in at least one movable micro mirror in a spatial light modulator (SLM), said at least one micro mirror is electrostatically attractable to at least one electrode. Said at least one micro mirrors is electrostatically attracted in a sequence of reversed electrical field between said micro-mirror and said at least one electrode.

In another aspect of the present invention said object is attained by a method to reduce charging effects affecting a degree of deflection of deflectable micro mirrors in a spatial light modulator. Said deflectable micro-mirrors are set in a desired deflection state. An electrical field is removed between said micro mirror and at least one addressing electrode before impinging electromagnetic radiation onto said spatial light modulator.

Further characteristics of the invention, and advantages thereof, will be evident from the detailed description of preferred embodiments of the present invention given hereinafter and the accompanying FIGS. 1a–5d, which are given by way of illustration only, and thus are not limitative of the present invention.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

Further, the preferred embodiments are described with reference to an excimer lacer source. It will be obvious to one with ordinary skill in the art that different pulsed electromagnetic radiation sources may be used, for instance a Nd-YAG laser, ion laser, Ti sapphire laser, free electron laser or other pulsed fundamental frequency lasers, flash lamps, laser plasma sources, synchrotron light sources etc.

Figure 1A:
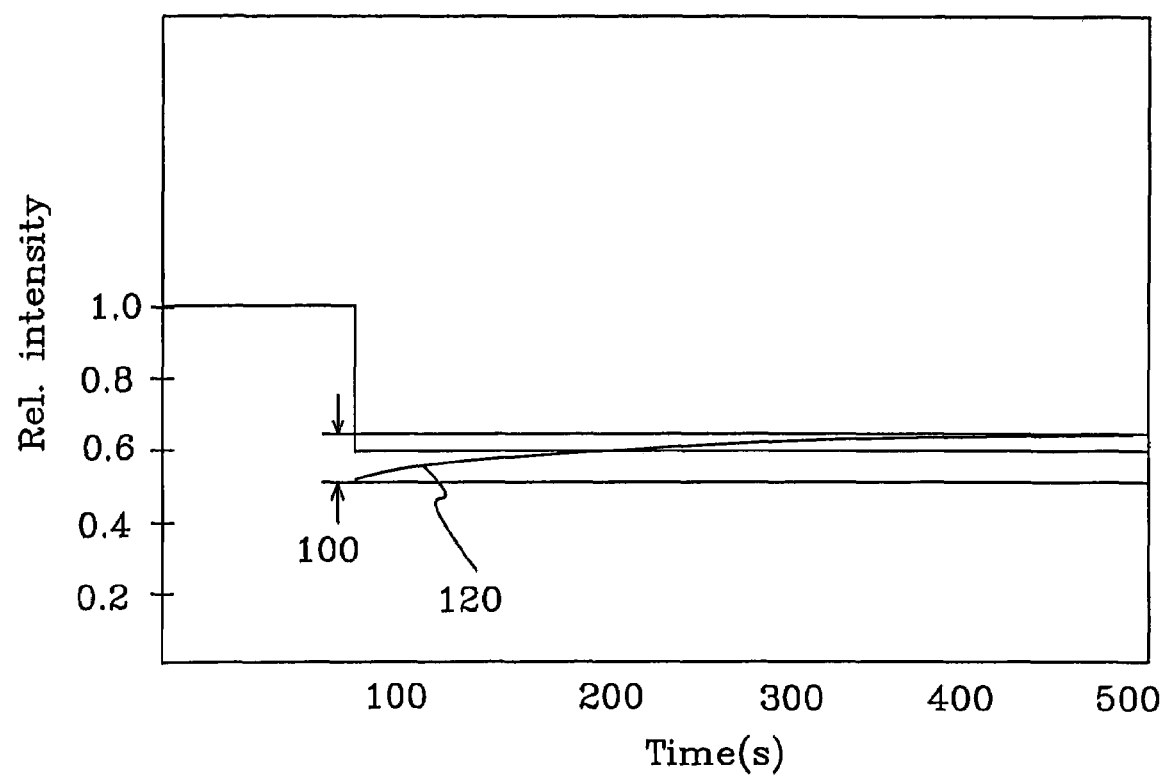
FIG. 1a depicts a drift of relative intensity when impinging electromagnetic radiation numerous of times onto an addressed micro mirror in a spatial light modulator.

FIG. 1a depicts a drift of relative intensity, which means that a white mirror is normalized to 1.0 units and a black mirror is represented by 0 units, when impinging electromagnetic radiation numerous of times onto an addressed micro mirror in a spatial light modulator. In FIG. 1a relative intensity is shown as a function of time. As a source for generating electromagnetic radiation a pulsed excimer laser is used, operating at 1 kHz pulse frequency. The output wavelength of said laser is 248 nm. It is obvious that other pulse frequencies and wavelengths may be used, which could be higher or lower than the specific values indicated as an example here.

During the first 100 s in FIG. 1, the micro mirror is in a non-addressed state, i.e., a white pixel. During the next coming 400 seconds said excimer laser is flashed when said mirror is in its addressed state and the relative intensity from the micromirror is detected. From FIG. 1a it is clear that the relative intensity is increasing by time due to charging effects. The charging effects charges the mirror surface and/or the surfaces of the electrodes in such way that a repetitive addressing with the same address voltage will affect the mirror to change its degree of deflection as a function of the number of times said mirror is addressed, together with electromagnetic radiation impinging onto said mirror and/or electrodes.

Figure 1B:
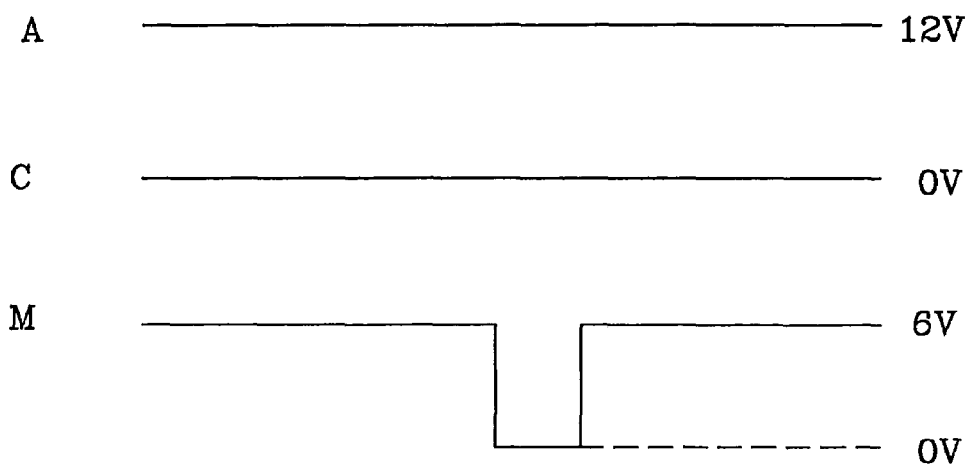
FIG. 1b depicts one addressing cycle of said micro mirror according to prior art.

FIG. 1b depicts an example of addressing cycle for the micro mirror, denoted M, according to prior art, which can be used to produce the graph according to FIG. 1a. An address electrode, denoted in FIG. 1b with A, is set to 12 V. A counter electrode, denoted with C, is set to 0V. The micro mirror element is initially set to 6V, defining a non-addressed state. When switching said micro mirror element 210 from the 6V potential to a 0V potential, said micro mirror element 210 will make a clockwise movement, if said address electrode 214 and said counter electrode 212 are arranged according to FIG. 2.

During the time said micro mirror element 210 is in said 0V state, the micro mirror is said to be in an addressed state. The duration said micro mirror is in said addressed state depends upon the period of time said micro mirror element is in said 0V state. In one embodiment a duty cycle of said addressed state is less than 1%.

Figure 2:
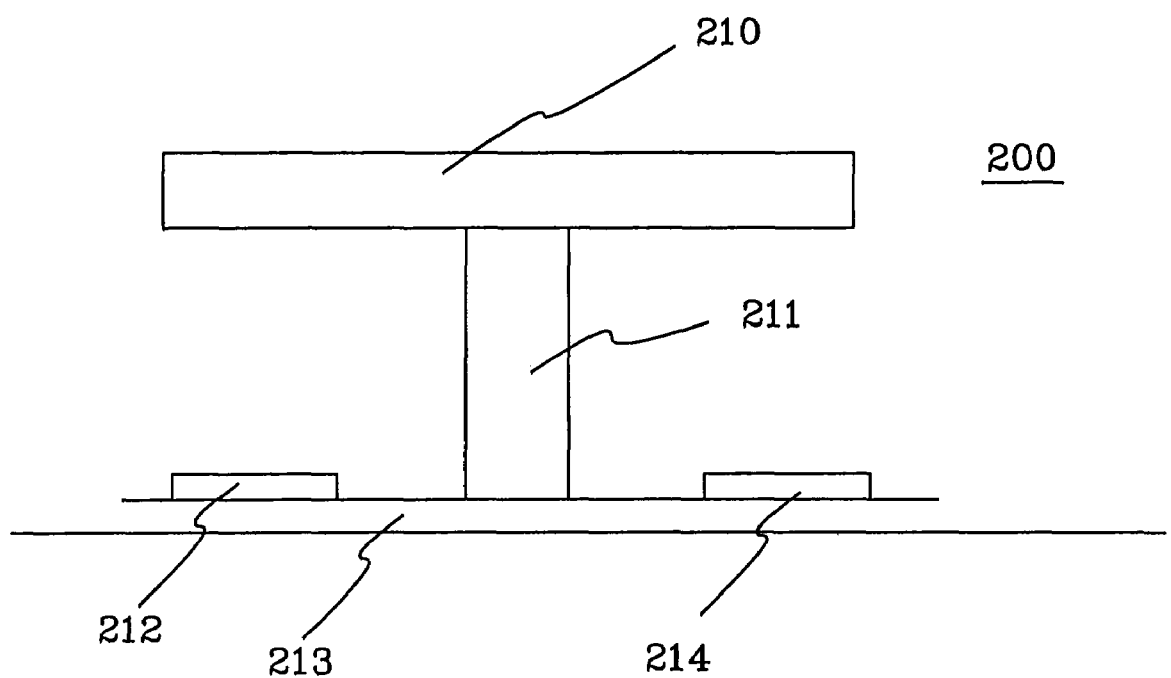
FIG. 2 depicts a micro mirror structure.

FIG. 2 illustrates a side view of a traditional actuator structure 200, which could be arranged in a spatial light modulator. Said actuator structure 200 comprises said mirror element 210, a support structure 211, said counter electrode 212, said address electrode 214 and a substrate 213 onto which said counter electrode 212, said address electrode 214 and said support structure 211 are arranged.

It has been experimentally verified, see FIG. 1a, that the intensity of said mirror element in said addressed state increases as a function of the number of laser pulses impinged onto said mirror element in said addressed state, see curve 120. A difference between a minimum relative intensity and the maximum relative intensity for said mirror element in said addressed state is denoted by 100 in FIG. 1a and is referred to as a drift. It is obvious from FIG. 1a that CD (critical dimension) may be affected by said drift. A higher relative intensity will give rise to an increased exposure, which in turn may affect the dimension of the feature to be printed.

Figure 3:
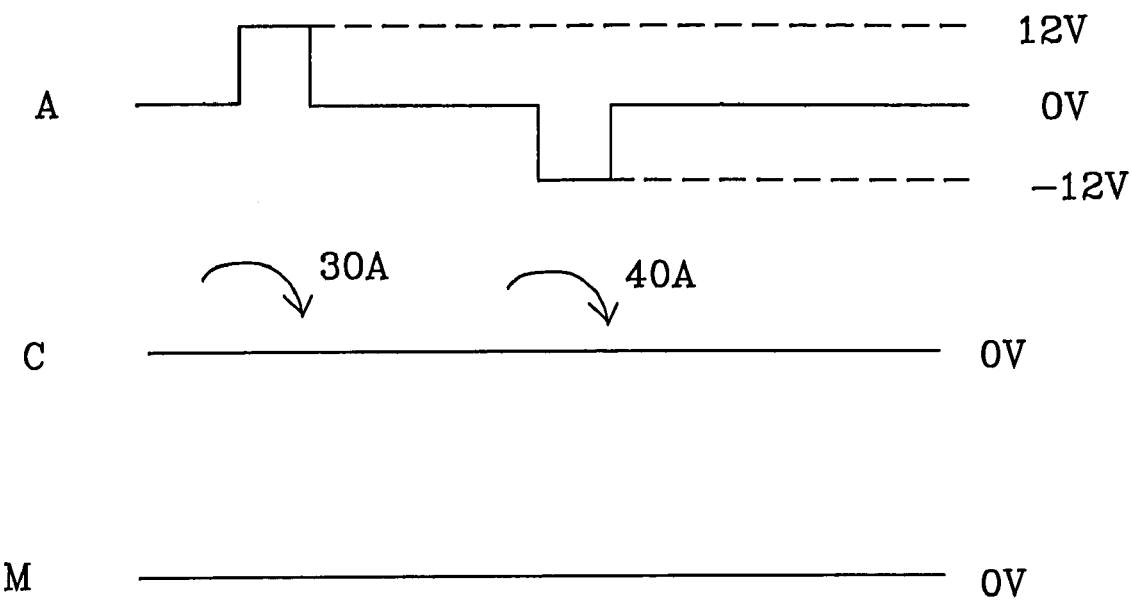
FIG. 3 depicts a first embodiment of addressing cycles according to the present invention.

FIG. 3 illustrates a first embodiment of addressing cycles according to the present invention for eliminating or at least reducing said charging effect. To begin with, said mirror element is set to 0V, said counter electrode is set to 0V and said address electrode is also set to 0V. All elements set to 0V, defines a non-addressed state. Switching said address electrode from said 0V potential to 12V potential will alter said actuator structure from a non-addressed state to an addressed state. Electromagnetic radiation will impinge onto said mirror element either when set to said addressed state or to said non addressed state. In a next coming address cycle, a so called frame, said counter electrode and said mirror element are still set to 0V potential but said address electrode will switch from 0V to −12V when switching from said non-addressed state to said addressed state. With 12V on said address electrode and 0V on said mirror element, an electrical field is directed from said address electrode to said mirror element. With −12V on said address electrode and 0V on said mirror element the electrical field is directed from said mirror element to said address electrode. In both cases said mirror element will move in a clockwise direction as indicated by arrows 30A and 40A. By applying a sequence of reversed electrical field in said addressed state one can eliminate or at least substantially reduce the charging effect. The sequence may have a period of 1, 2, 3 or higher. Said sequence may also be randomized.

Figure 4:
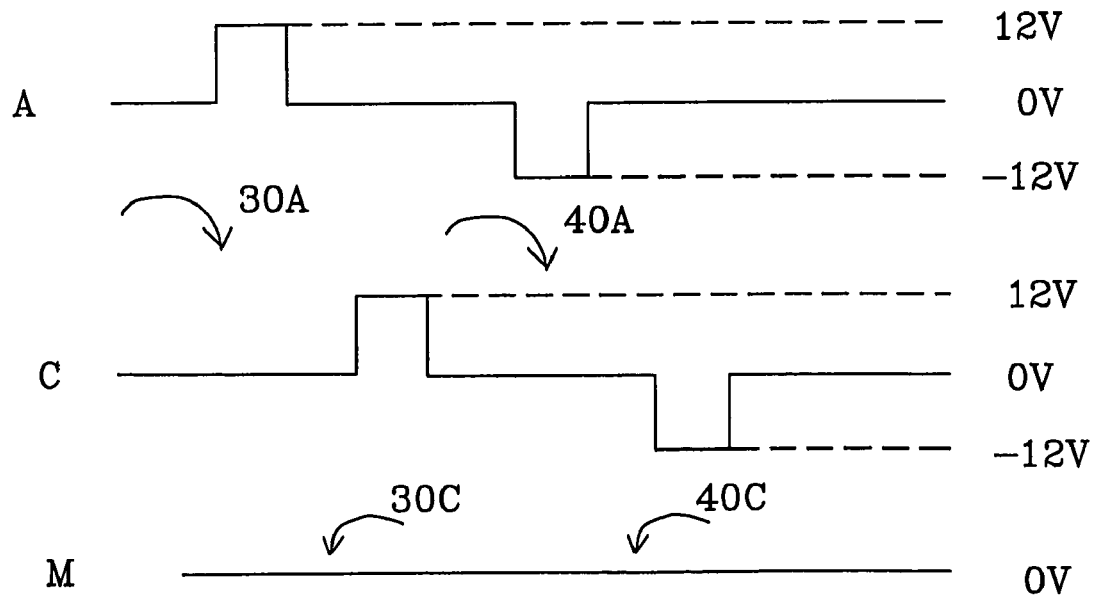
FIG. 4 depicts a second embodiment of addressing cycles according to the present invention.

FIG. 4 illustrates another embodiment according to the present invention in which the charging effect is eliminated or at least substantially reduced. In this embodiment both the address electrode and the counter electrode are used to deflect said mirror element clock-wise or counter-clockwise. The address electrode is switched between 0V and 12V or 0V and −12V in order to deflect said mirror element clock-wise with opposite directions of the electrical field as described above. The counter electrode is switched between 0V and 12V or 0V and −12V to deflect said mirror element counter-clock-wise with opposite directions of the electrical field. In the illustrated addressing scheme in FIG. 4, the direction of movement, i.e., clock-wise or counter-clockwise, has a period of 1, while the reversed field has a period of two, i.e., the direction of movement changes for every addressing cycle but the direction of electrical field only changes for every second addressing cycle or frame. It is however possible to have direction of movement with a period of two and a reversed field with a period of one. It is also possible to have any period of at least one of said reversed field or said direction of movement or a non-periodic sequence of at least one of said direction of movement or said reversed field. An example of a non-periodic sequence is a random sequence.

Figure 5:
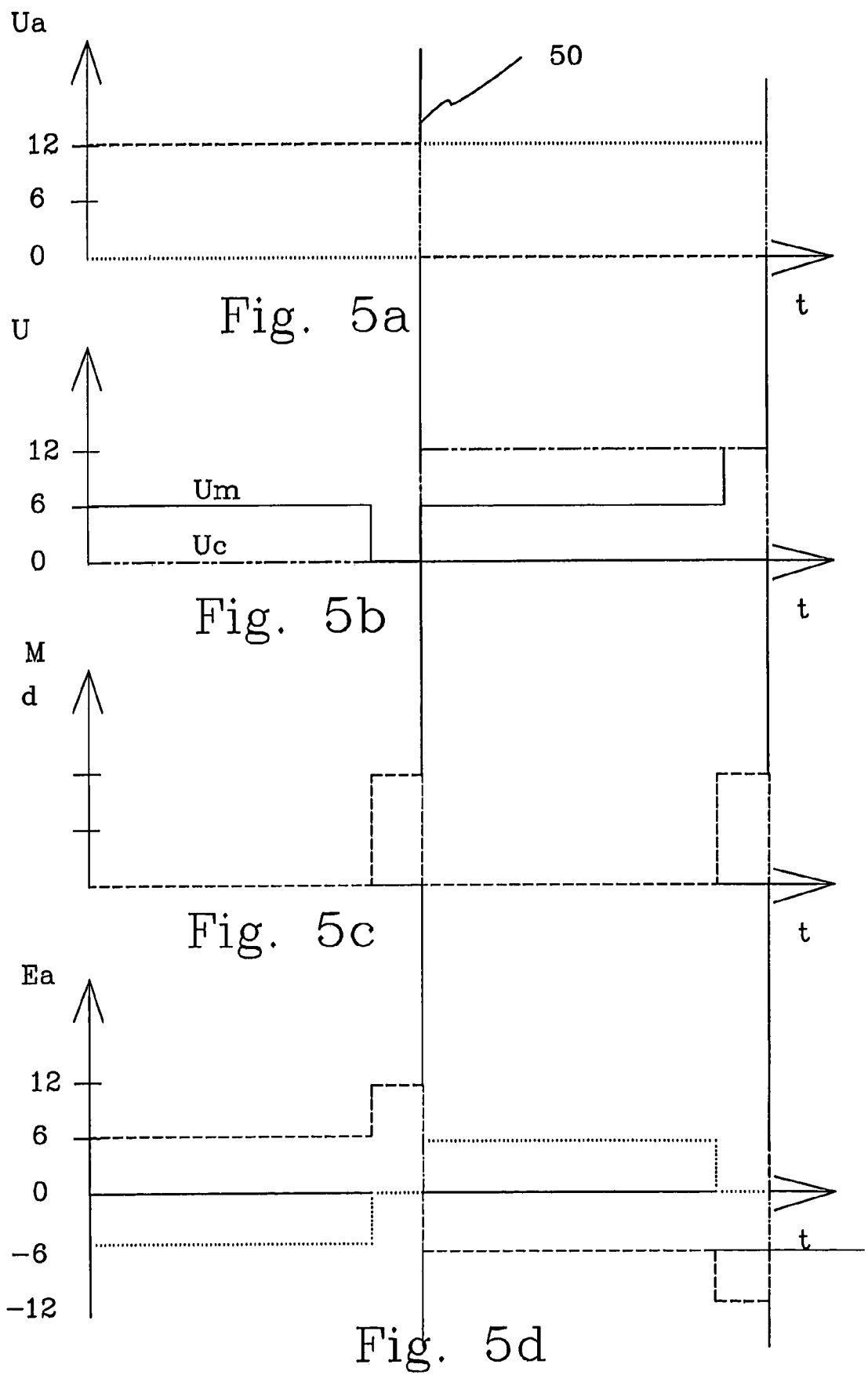
FIG. 5a–5d depicts a third embodiment of addressing cycles according to the present invention.

FIG. 5a–d illustrates still another embodiment according to the present invention, in which the charging effect is eliminated or at least substantially reduced. FIG. 5a illustrate for two frames the addressing voltage Ua for a black (dashed line) and a white (dotted line) pixel. FIG. 5b illustrates for the same two frames a mirror voltage (solid line) Um and counter voltage (phantom line) Uc.

For the white pixel, an electrical field Ec at the counter electrode is the same as the electrical field Ea at the addressing electrode, see FIG. 5d, where the dashed line represents the black pixel and the dotted line the white pixel. The resulting torque M and deflection d are shown for the black pixel (dashed line) in FIG. 5c. Said torque and deflection is always zero for white pixels, not illustrated.

The most illustrative example is to describe the black pixel, since said pixel is moved in comparison to the white one. In FIG. 5a said black pixel is represented, as mentioned above, with a dashed line. This is also true for the black pixel in FIGS. 5c and 5d. In a first frame, i.e., to the left of line 50, the addressing electrode is addressed to 12V, the mirror electrode is addressed to 6V and the counter electrode is addressed to 0V. Just before the first frame is ended, said mirror electrode is switched from 6V to 0V, thereby moving the movable element to the black state as indicated in FIG. 5c, i.e., the pixel is not black during the whole frame but rather a short period of the same. This period may be determined to be as short as one wants to, e.g., 200 ns or smaller.

In the second frame, beginning just to the right of line 50, said address electrode is addressed to 0V, said mirror electrode is addressed to 6V and said counter electrode is addressed to 12V. Just before said second frame is ending, said mirror electrode is addressed to 12V and thereby moving said movable element to its black state according to FIG. 5c. From FIG. 5d one can see that the electrical field for the black pixel in the first and the second frame is reversed. In the first frame said electrical field is +6V or +12V, whilst in the second frame said electrical field is −6V or −12V. As can be seen from FIG. 5d, the electrical field for white pixels is also reversed, although said pixel is never deflected or moved from its position.

In the above-disclosed embodiments said mirror element is switched between two states only, the non-addressed state and one addressed state. SLM's operated in analog mode have a plurality or numerous different addressed states, which may be used in lithography to define different gray scale values. In Micronic Laser System's own Sigma machine, which utilizes spatial light modulation to create a pattern on a workpiece, said number of gray scale levels is 65 including the non-addressed state and a fully addressed state. Those of ordinary skill in the art will recognize a variety of number of addressing states defining an equal number of gray scale levels.

In another embodiment according to the present invention to eliminate or substantially reduce said charging effect, an electrical field between at least one of the electrodes, addressing electrode and/or counter electrode, and said mirror element is removed before electromagnetic radiation is impinged onto said mirror element. The electrical field is removed shortly before said electromagnetic radiation is impinged onto the mirror element in order to have control of the degree of deflection. The shorter the time period is between the removal of said electrical field and the electromagnetic flash, the more the degree of deflection corresponds with the degree of deflection when the electrical field is applied. There is always some inertia in removing the mirror element from the addressed state to a non-addressed state, where the non-addressed state is reached after a number of sinusoidal oscillations with declining amplitude. By knowing the characteristics of said sinusoidal oscillations, which for instance may be experimentally verified, it is obvious that the time period from removing the electrical field to the flash can be substantially prolonged. For instance, by setting the mirror element to a more deflected state than intended for the electromagnetic flash, said time period between the removal of the electrical field and said flash can be predicted to hit the right position of the oscillation of said mirror element having the right degree of deflection.

Figure 6:
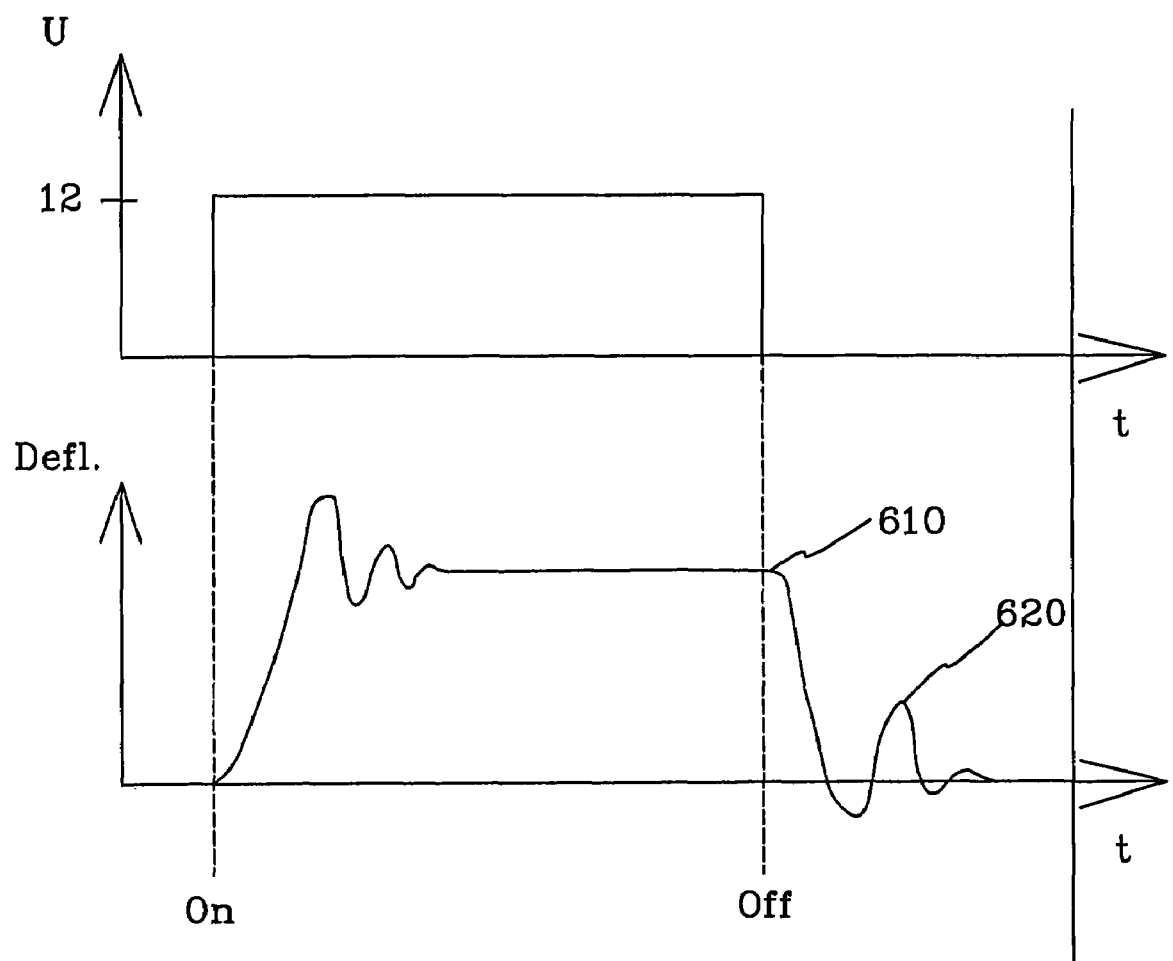
FIG. 6 depicts fourth embodiment of preventing charging effects in the SLM structure.

FIG. 6 is an illustration of the embodiment of removing the electrical field before flashing the laser radiation onto the SLM structure. The upper part of the figure illustrates the mirror voltage versus time whereas the lower part of the figure illustrates the mirror deflection versus time. One addressing cycle or frame is illustrated. When the mirror voltage is switched from 0V to 12V, i.e., an On point in FIG. 6, the mirror is starting to oscillate before stabilizing to a certain deflection state. When the mirror voltage is removed, i.e., an Off point, the mirror is again starting to oscillate before stabilizing to a non-deflected state. Point 610 and 620 represent two possible points where no electrical field is applied between the mirror element and any one of the electrodes where said electromagnetic radiation may be impinged onto the mirror element. Of course any point after the electrical field has been removed, i.e., after the Off point in FIG. 6, may be used as a trigger point for flashing the laser, but a minimum or a maximum is more well defined than the other points.

The time it takes for the mirror element to change a certain degree of deflection depends inter alia on the type of mirror structure, material used and the dimension of said mirror structure. In one embodiment the time period between the removal of the electrical field and said impinging of said electromagnetic radiation onto the same mirror element is less than 200 ns. In another embodiment said time period is less than 100 ns, and in yet another embodiment said period of time is less than 50 ns.

The mirrors may be moved by deflection or by piston movement or a combination of a deflection and piston movement.

While the present invention is disclosed by reference to the preferred embodiments and examples detailed above, it is understood that these examples are intended in an illustrative rather than in a limiting sense. It is contemplated that modifications and combinations will readily occur to those skilled in the art, which modifications and combinations will be within the spirit of the invention and the scope of the following claims.

The invention claimed is:

1. A method to reduce charging effects affecting a degree of deflection in at least one tilting micro mirror in a spatial light modulator (SLM), said at least one micro mirror is electrostatically attractable to at least one electrode, including the action of:
   attracting electrostatically said at least one micro mirrors in a sequence of reversed electrical field between said micro mirror and said at least one electrode, wherein said sequence of reversed electrical field is non-periodic.

2. A method to reduce charging effects affecting a degree of deflection in at least one tilting micro mirror in a spatial light modulator (SLM), said at least one micro mirror is electrostatically attractable to at least one electrode, including the actions of:
   attracting electrostatically said at least one micro mirrors in a sequence of reversed electrical field between said micro mirror and said at least one electrode; and
   deflecting said movable micro mirror in a sequence of clockwise and counter-clockwise movement
   wherein said sequence of clockwise and counter-clockwise movement is non-periodic.

3. A method to reduce charging effects affecting a degree of deflection of deflectable micro mirrors in a spatial light modulator, including the actions of:
   setting said deflectable micro mirrors in a desired deflection state,
   removing an electrical field between said micro mirror and at least one addressing electrode before impinging electromagnetic radiation onto said spatial light modulator.

4. The method according to claim 3, wherein said fields are removed less than 200 ns before said eledromagnetic radiation impinges onto said SLM.

5. The method according to claim 3, wherein said fields are removed less than 100 ns before said electroraagnetic radiation impinges onto said SLM.

6. The method accofding to claim 3, wherein said electromagnetic radiation is relayed by said spatial light modulator onto a substrate to be exposed by said radiation.

7. The method according to claim 3, wherein said fields are removed less than 50 ns before said electromagnetic radiation impinges onlo said SLM.

* * * * *

UNITED STATES PATENT AND TRADEMARK OFFICE
CERTIFICATE OF CORRECTION

| | | |
|---|---|---|
| PATENT NO. | : 7,072,090 B2 | |
| APPLICATION NO. | : 10/829679 | |
| DATED | : July 4, 2006 | |
| INVENTOR(S) | : Dürr et al. | |

It is certified that error appears in the above-identified patent and that said Letters Patent is hereby corrected as shown below:

Title Page, Item (75) Inventors should read:

-- (75)　Inventors:　Peter Dürr, Dresden (DE); Ulric Llungblad, Mölndal (SE); Ingo Wullinger, Dresden (DE) --.

Signed and Sealed this
Twenty-fifth Day of August, 2015

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 7,072,090 B2 | Page 1 of 1 |
| APPLICATION NO. | : 10/829679 | |
| DATED | : July 4, 2006 | |
| INVENTOR(S) | : Peter Dürr et al. | |

It is certified that error appears in the above-identified patent and that said Letters Patent is hereby corrected as shown below:

TITLE PAGE:

Item [75], Inventors, "Peter Dürr, Dresden (DE); Ulric Llungblad, Mölndal (SE); Ingo Wullinger, Dresden (DE)" (as corrected to read in the Certificate of Correction issued August 25, 2015) is deleted and patent is returned to its original state with the Inventors name in patent to read -- Peter Dürr, Dresden (DE); Ulric Llungblad, Mölndal (SE) --

Signed and Sealed this
Twenty-second Day of December, 2015

Michelle K. Lee
*Director of the United States Patent and Trademark Office*